United States Patent

[11] 3,604,082

[72] Inventors Robert D. McBrayer;
 Forrest I. Peters; Robert D. Smith, all of Raleigh, N.C.
[21] Appl. No. 771,787
[22] Filed Oct. 30, 1968
[45] Patented Sept. 14, 1971
[73] Assignee Corning Glass Works
 Corning, N.Y.

[54] METHOD OF MAKING A CAPACITOR
 31 Claims, 12 Drawing Figs.
[52] U.S. Cl. ..................................................... 29/25.42,
 117/227, 156/89, 317/261
[51] Int. Cl. ......................................................... H01g 13/00
[50] Field of Search ............................................ 29/25, 42;
 65/33; 156/89; 317/261; 117/227

[56] References Cited
UNITED STATES PATENTS

| Re.26,421 | 7/1968 | Rodriguez et al. | 29/25.42 |
| 3,189,974 | 6/1965 | Fabricius | 29/25.42 |
| 3,439,395 | 4/1969 | Claypoole et al. | 29/25.42 |
| 3,480,421 | 11/1969 | Allen | 65/33 |

Primary Examiner—John F. Campbell
Assistant Examiner—Carl E. Hall
Attorneys—Clarence R. Patty, Jr. and Walter S. Zebroski

ABSTRACT: A capacitor produced by providing a plurality of thin dielectric sheets in the green state formed of a crystallizable glass frit in a binder. A film of a slurry or suspension of particulate metal in a vehicle is applied to two green dielectric sheets in a predetermined position to form capacitor electrodes. A green capacitor stack or assembly is formed by disposing one of said green dielectric sheets with said electrode applied thereto over the other so that the electrodes in part overlap each other. A third green dielectric sheet is disposed over the exposed electrode to form a cover for the electrode and the green capacitor assembly. The assembly so formed is placed on a pallet and subjected to a temperature sufficient to volatilize or burn out all of the organic constituents of the assembly. The temperature is then raised to soften the glass and pressure is applied to the assembly to coalesce and compact the glass, seal adjacent members together, and produce a substantially dense, void-free, monolithic structure. The assembly is then heat treated to crystallize the glass and form a glass-ceramic dielectric within which the electrodes are imbedded, after which the temperature and pressure are removed. The edge portions of the capacitor stack or assembly are then removed to expose the nonoverlapping ends of the electrodes which may thereafter be metallized and to which leads are attached. Capacitors may be formed with as many plates as are desired in the above manner, in which case alternate electrodes are in register with one another. In addition, a plurality of discrete capacitor units may be formed simultaneously in the above manner and thereafter separated after the glass is crystallized. Further, an electrode may be first applied to one green dielectric sheet and a second green dielectric sheet disposed thereover substantially in register with the first. A second electrode is then applied to the second sheet in which a shifted position so as to partly overlap the first electrode. As many additional green dielectric sheets and electrodes may be stacked thereon in this manner as are desired and a final green dielectric sheet is disposed over the assembly so formed substantially in register with all of the other sheets to provide a cover for the green assembly. The green assembly is then fired as above.

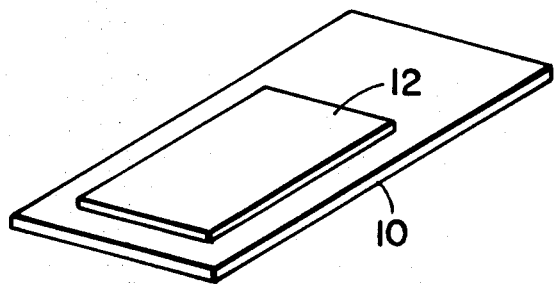
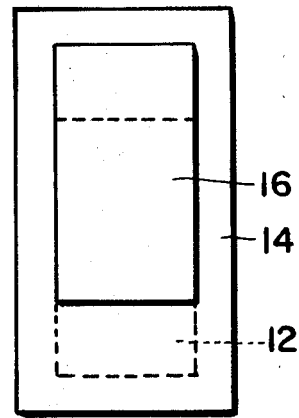
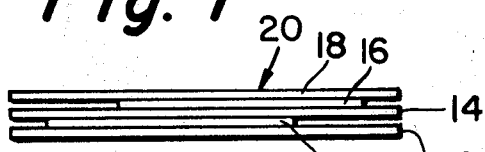
Fig. 1
Fig. 2
Fig. 3
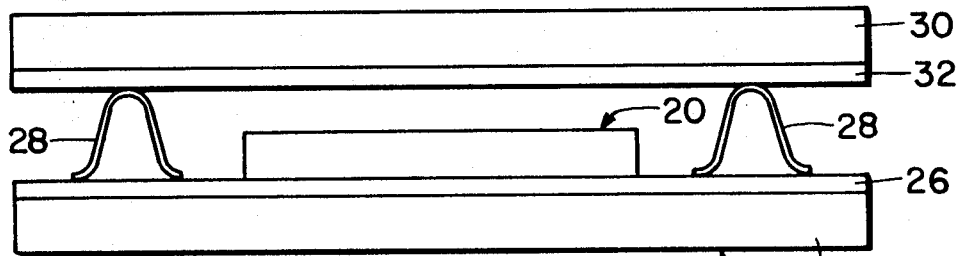
Fig. 4
Fig. 5
INVENTORS.
Robert D. McBrayer
Forrest I. Peters
Robert D. Smith
BY
Walter S. Zebrowski
ATTORNEY INVENTORS.
Robert D. McBrayer
Forrest I. Peters
Robert D. Smith
BY
Walter S. Zebrowski
ATTORNEY

METHOD OF MAKING A CAPACITOR

BACKGROUND OF THE INVENTION

Heretofore stacked capacitors have been made by using a glass or other dielectric material ribbon over which metallic foil is disposed followed by a second dielectric ribbon over which a second foil is disposed such that a portion thereof overlaps the first foil. This would comprise one set of plates and additional plates may be similarly stacked on top thereof to the extent necessary to obtain the desired electrical characteristics. The stack is then covered by a cover ribbon and the entire assembly subjected to temperature and pressure whereby the dielectric is softened and caused to adhere to adjacent foils and ribbons. Such a structure is thereafter cut to proper widths to form individual capacitors. Leads are attached to opposite ends of such capacitors and the exposed capacitor plates along the cut edges are glazed. Thereafter, the capacitors are encapsulated in some desirable manner, well known in the art.

Such a method has the disadvantages of requiring delicate handling of the thin glass dielectric ribbon. It requires much handling and precise control to obtain a capacitor stack, and is not well adapted to mass production methods. The cut sides of the individual capacitors must be glazed since, otherwise, the electrodes would be exposed and subjected to detrimental environmental affects and would result in voltage flashover between electrodes of opposite polarity. In addition, the glass would not provide the desired electrical properties of a ceramic.

Other stack capacitors have been known wherein the capacitor stack is formed by applying to a rigid base a layer of enamel or other ceramic composition, to which layer is applied a number of individual powdered metallic areas. A second vitreous enamel layer is applied thereover and a second series of powdered metallic areas are applied to the second vitreous enamel layer. The stack is completed by continuing the process until the desired number of dielectric electrode layers are built up. The block is then cut horizontally and vertically into individual capacitor units which are thereafter fired to form individual capacitors.

Such a process has the disadvantages of requiring delicate handling of the stack and is not well adapted to mass production methods. The process requires much higher temperatures to coalesce or fuse the ceramic or enamel particles thereby melting the particulate electrode material causing it to "ball-up." This results in discontinuous electrodes having varying thicknesses producing capacitors with poor and unreproducible electrical properties. Capacitors produced by this method have a porous structure further reducing the quality thereof. In addition, the exposed electrodes on the cut sides require edge glazing.

SUMMARY OF THE INVENTION

It is an object of the present invention to provide a method for economic and rapid fabrication of capacitors which overcomes the heretofore-noted disadvantages, and which provides substantially void-free capacitors.

A further object of the present invention is to provide a relatively low-temperature method of fabricating capacitors of high dielectric constant, the electrodes of which capacitors are substantially hermetically enclosed when they are separated from a capacitor stack or assembly.

Broadly, in accordance with this invention, a method of forming a capacitor comprises forming a plurality of thin dielectric sheets in the green state comprising a crystallizable glass frit in a binder. A green capacitor stack or assembly is formed by disposing a film of a slurry or suspension of a particulate metal in a vehicle between each of three of said green dielectric sheets such that the two films partly overlap each other. The green assembly so formed is subjected to an elevated temperature to burn out any organic constituents contained in the assembly. The temperature is then increased to soften the glass, and pressure is applied to the assembly to compact and coalesce the glass, and to seal adjacent members together thereby forming a substantially dense, void-free, monolithic capacitor unit. The unit is then heat treated so as to crystallize the glass to form a glass-ceramic, and the temperature and pressure are thereafter removed. Edge portions of the unit are removed so as to expose the nonoverlapping ends of the electrodes. Thereafter, leads are attached to the exposed ends of the electrodes. Capacitors may be formed with as many sets of plates as are desired by continuing the above-described stacking process until a satisfactory number of plates and dielectric layers are obtained. In such a situation, alternate electrodes are in register with one another. In addition, a plurality of capacitor units may be formed simultaneously by disposing a plurality of films between each of the green dielectric sheets in the above-described manner and, then separating the individual capacitor units after the glass is crystallized.

Additional objects, features, and advantages of the present invention will become apparent to those skilled in the art from the following detailed description and the attached drawings on which, by way of example, only the preferred embodiments of this invention are illustrated.

BRIEF DESCRIPTION OF THE DRAWINGS

FIG. 1 is an oblique view of one capacitor electrode formed on a green dielectric sheet.

FIG. 2 is a plan view of a pair of capacitor electrodes formed in accordance with the present invention.

FIG. 3 is a side elevation of a pair of capacitor elements formed in accordance with the present invention.

FIG. 4 is a side elevation of an apparatus suitable for supporting the green capacitor stack of the present invention.

FIG. 5 is a side elevation of an apparatus illustrating the application of pressure to the capacitor stack of the present invention.

DETAILED DESCRIPTION

Figure 6:
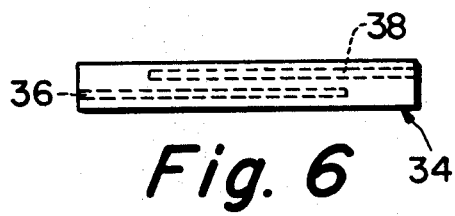
FIG. 6 is a side elevation of a capacitor unit formed in accordance with the present invention wherein the ends of the electrodes are exposed.

FIGS. 1, 2, and 3 illustrate the steps of forming a capacitor stack or assembly in the green state. By the expressions green or green state as used herein is meant an article or element before any organic constituent contained therein is volatilized or burned off, the particulate material is coalesced and compacted under the influence of at least temperature, and/or before the glass is crystallized to form a glass-ceramic. Referring to FIG. 1, there is shown a thin sheet 10 of dielectric material in the green state, herein referred to as the green dielectric sheet, to which is applied a first elongated film 12 in a predetermined position thereon.

Green dielectric sheet 10 is formed of a green glass frit in an organic binder, examples of which are taught in copending patent application entitled "Composition For Forming Films" by R. D. Smith and W. B. Upchurch filed concurrently herewith. Suitable glass compositions which may be thereafter crystallized to form high dielectric constant glass-ceramics are taught by U.S. Pat. No. 3,195,030 by A. Herczog and S. D. Stookey. Sheet 10 may be formed by doctor blading or as described in copending U.S. Pat. application Ser. No. 626,560 filed Mar. 28, 1967, now abandoned, by R. L. Cato, P. D. Leonard, and R. D. Smith. The Smith-Upchurch and Cato-Leonard-Smith patent applications as well as the Herczog-Stookey patent are herein incorporated by reference.

Film 12 is formed of a slurry or suspension of particulate metal in a volatile organic vehicle. Suitable metals are gold, silver, platinum, palladium, alloys thereof, and the like. The volatile organic vehicle may be kerosene, pine oil, organic resin in solution, a vehicle known as Reusche No. 163-E produced by L. Reusche and Company of Newark, New Jersey, or the like. It is necessary that the volatile organic vehicle is mechanically and chemically compatible with the organic binder of the green dielectric sheet. Examples of suitable metal slurries or suspensions are Hanovia Composition No. A-1264 produced by Hanovia Liquid Gold Division, Engelhard Industries, East Newark, N.J. or Composition No. EP-8234 produced by E. I. du Pont Company, Wilmington, Del. A particularly suitable suspension is one wherein the particulate metal consists of about 99 percent by weight of gold. The slurry or suspension of particulate metal may be applied in any manner well known to the art. For example, the film may be applied by forcing it through a stencil by means of a squeegee or other similar implement which process is known as silk screening. The film may also be applied by spraying or the like.

FIG. 2 illustrates a second green dielectric sheet 14 disposed over film 12 and dielectric sheet 10 substantially in register with sheet 10. Since film 12 has been applied in the form of a slurry or suspension in a liquid vehicle it adheres sheet 14 to sheet 10. This adherence is particularly desirable during subsequent processing of the capacitor stack or assembly since it maintains the various elements in position during handling. A second elongated film 16 is then applied to green dielectric sheet 14 in the same manner as film 12, however, the position of film 16 is shifted or offset from that of film 12 in the longitudinal direction thereof so that only a portion of the films overlap while the remaining portion of the films are in a nonoverlapping relationship. First film 12 and second film 16 comprise the capacitor electrodes with the effective capacitance area being that which corresponds substantially to the overlapping area. FIG. 3 illustrates a third green dielectric sheet 18 disposed over film 16 substantially in register with sheets 10 and 14. In FIG. 3 is shown a simple two electrode green capacitor stack or assembly 20 with sheet 18 being a cover for the stack.

After the green capacitor assembly or stack 20 is completed, it is placed upon a pallet 22 comprising a rigid pallet base 24 upon which is disposed a release sheet 26 of material which will prevent the capacitor stack from adhering to the base during subsequent firing. Sheet 26 may be formed of mica, combinations of mica and fiber glass, or the like. Capacitor stack 20 is disposed on release sheet 26 in between standoffs 28 which are provided to support pressure distribution plate 30 above and in a noncontacting relationship with capacitor stack 20 during certain steps of the present method. Standoffs 28 are formed of suitable material such as stainless steel or the like. Since plate 30 will ultimately contact capacitor stack 20, a release sheet 32 is provided at the bottom surface of plate 30 for the same purposes that sheet 26 is provided. The pallet assembly shown in FIG. 4 is then placed in a suitable furnace, not shown, and subjected to a temperature sufficient to volatilize or burn off any of the organic constituents in the capacitor stack. Thereafter the temperature is elevated to coalesce and compact the glass of the dielectric sheets and to seal adjacent members together to form a substantially dense, void-free, monolithic unit. Toward this end, pressure is applied to capacitor stack 20 to effect the compacting and sealing. One manner in which pressure may be applied to and distributed over capacitor stack 20 is, for example, by means of a hydraulic piston 33 which causes standoffs 28 to collapse and plate 30 with release sheet 32 to lower thereby contacting stack 20 as illustrated in FIG. 5. Furnaces with such pressure application means are well known in the art. Stack 20 is then maintained under pressure and elevated temperature until said dense substantially monolithic capacitor unit is achieved. Such a monolithic unit is then subjected to a heat treatment so as to crystallize or devitrify the glass to form a glass-ceramic. The process of forming a semicrystalline glass-ceramic body is taught in the heretofore noted Herczog-Stookey patent.

Since the compacting, coalescing, and sealing is accomplished while the dielectric is in a glass state, it can be performed at a relatively low temperature far below that of the melting temperature of relatively economical electrode materials. Desired electrical properties not possessed by the glass, such as dielectric constant and the like, are obtained from the crystalline body after heat treatment. It is to be noted that heat treatment temperatures are also maintained well below the melting point of the preferred electrode materials wherein a dense monolithic capacitor unit having highly desirable electrical properties may be produced at relatively low temperatures. It is desirable not to melt the electrode materials since the metal tends to "ball-up" and form discontinuities in the electrodes as well as producing electrodes having varying thicknesses which may result in capacitors having varying electrical properties. It is also to be noted that ceramic materials cannot be coalesced or compacted at temperatures below the melting point of the more economical electrode materials wherefore capacitors made with such ceramic materials result in both dielectric voids and "balled-up" electrodes.

A dense monolithic capacitor unit 34 is illustrated in FIG. 6 after it has been heat treated and the temperature and pressure removed. In addition, capacitor unit 34 is illustrated with the edge portions thereof removed so as to expose the nonoverlapping ends of electrodes 36 and 38.

Figure 7:
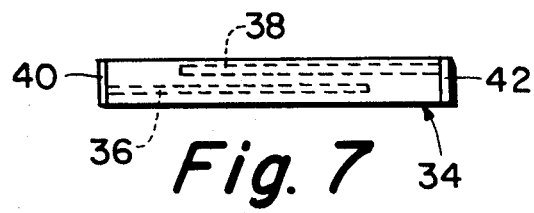
FIG. 7 is a side elevation of a capacitor unit wherein the exposed ends of the electrodes are metallized in accordance with the present invention.
Figure 8:
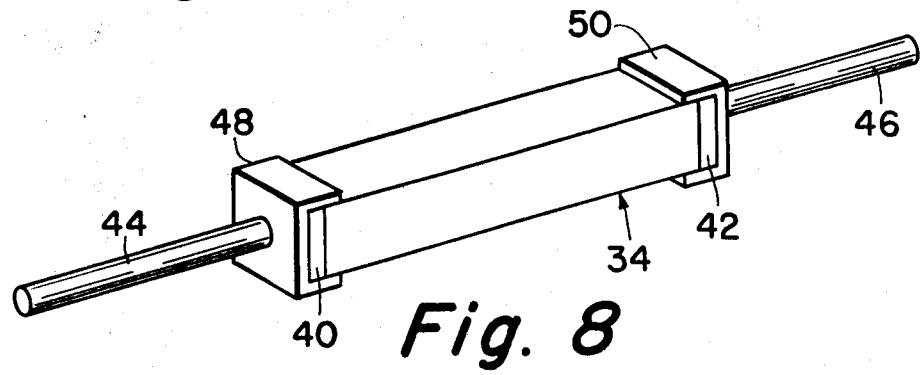
FIG. 8 is an oblique view of a discrete capacitor of the present invention with leads attached.

Capacitor unit 34 may then have the ends containing the exposed electrodes metallized by applying to such ends layers 40 well known 42 of a suitable metal such as silver or the like. Layer 40 is in electrical contact with electrode 36 while layer 42 is in electrical contact with electrode 38 as illustrated in FIG. 7. Capacitor leads 44 and 46 are thereafter attached to capacitor unit 34 as illustrated in FIG. 8. Leads 44 and 46 are shown with U-shaped members 48 and 50 disposed over the ends of capacitor unit 34. Leads 44 and 46 contact the respective ends of the capacitor unit by any suitable means such as, for example, soldering the U-shaped members to metallized layers 40 and 42 or directly to the electrodes. Of course, leads having upset ends or other types of leads well known in the art may also be used.

Such a capacitor may thereafter be encapsulated, as for example, by applying a resin or the like in any manner well known in the art. It is to be noted that since films 12 and 14 are applied so as not to reach the edges of the green dielectric sheets, the resulting capacitor unit 34 is hermetically sealed by means of the glass-ceramic dielectric which completely surrounds the electrodes. The electrodes are exposed only at the ends where contact is made between the electrodes and the exterior leads.

Figure 9:
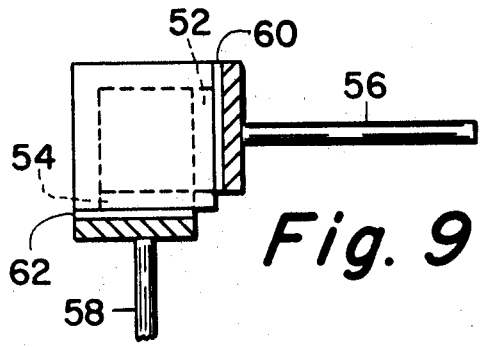
FIG. 9 is a cross-sectional plan view of another embodiment of the present invention.

FIG. 9 illustrates another embodiment of the preset invention wherein capacitor electrodes 52 and 54 are applied to dielectric sheets such that the nonoverlapping portions thereof extend in directions at least about 90° from one another. Leads 56 and 58 make electrical contact with electrodes 52 and 54 through metallized layers 60 and 62 respectively. AS with the embodiment illustrated in FIG. 8, leads 56 and 58 may be directly connected to electrodes 52 and 54 by soldering or the like.

Figure 10:
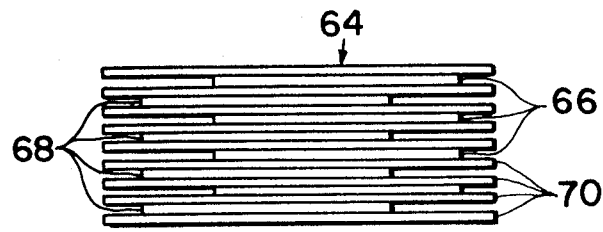
FIG. 10 is a side elevation of still another embodiment of the present invention.

FIG. 10 illustrates another embodiment of the present invention wherein capacitor stack 64 comprises a plurality of sets of electrodes 66 and 68 separated by green dielectric sheets 70. As will be readily understood, the process described in conjunction with forming capacitor stack 20, illustrated in FIG. 3, can be repeated to form as many pairs of capacitor plates as desired to provide a capacitor having the proper electrical properties. Stack 64 would thereafter be subjected to temperature and pressure as heretofore described. Green dielectric sheets 70 will all be substantially in register with one another whereas the metallic films comprising alternate electrodes 68 will be in register with one another while the metallic films comprising alternate electrodes 66 will similarly be in register with one another but will only partly overlap electrodes 68. Accordingly, the plurality of electrodes 68 will all have the nonoverlapping portions thereof extending in one direction whereas the nonoverlapping portions of electrodes 66 will all extend in another direction at least about 90° from the direction of electrodes 68. As is readily seen, the metallic slurry or suspension comprising electrodes 66 and 68 will be particularly useful in adhering adjacent green dielectric sheets 70 while subsequent electrodes and sheets are applied.

Figure 11:
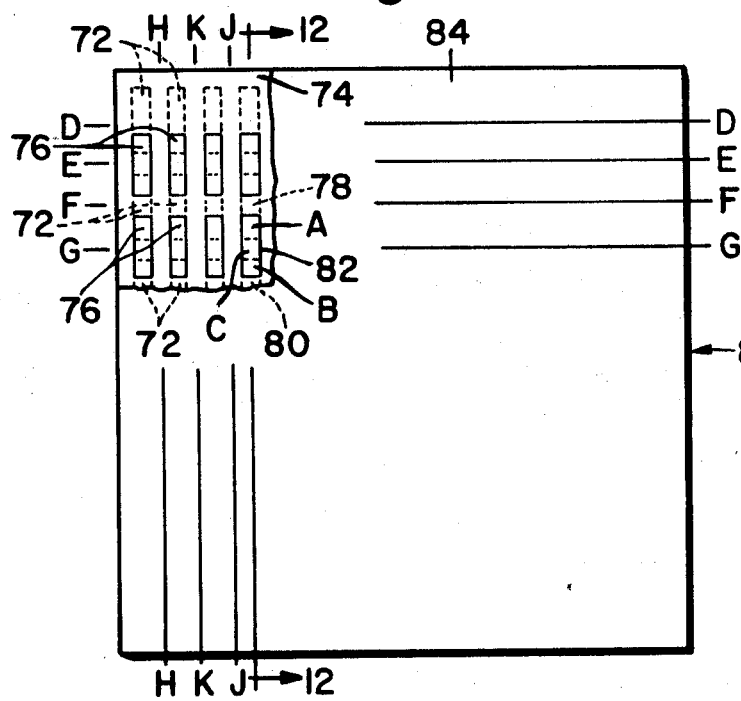
FIG. 11 is a fragmentary plan view illustrating mass production means of forming the capacitor of the present invention.

FIG. 11 illustrates a means by which a plurality of capacitor units may be formed simultaneously for greatest economic benefit. A plurality of sets of elongated films 72 are first applied to one green dielectric sheet in a suitably spaced and positioned manner. Thereafter a second green dielectric sheet 74 is disposed thereover in register with the green dielectric sheet to which films 72 were applied. A second plurality of elongated films 76 are then applied to green dielectric sheet 74 in such manner that a portion of each of films 76 will overlap a portion of at least one of said plurality of films 72. In particular, films 78 and 80, being two of the plurality of films 72, have been positioned such that film 82, one of the plurality of films 76, can be applied to sheet 74 so as to partly overlap both film 78 and film 80. This is illustrated by rectangles "A" and "B," "A" being the overlapping portion between films 78 and 82 and "B" being the overlapping portion between films 80 and 82. Rectangle "C" is that portion of film 82 which does not overlap any of the plurality of films 72.

A third green dielectric sheet 84 is then disposed over the plurality of films 76 to provide a cover therefor. As will be readily understood, the plurality of capacitor units formed in accordance with the illustration of FIG. 11 may be simply a plurality of two electrode capacitors as illustrated in FIG. 3, or may be a plurality of multiple electrode capacitors as illustrated in FIG. 10. To obtain multiple pairs of electrodes, the process described in conjunction with FIG. 11 above is repeated as many times as is necessary to produce the proper electrical characteristics of the capacitor. Accordingly, a third plurality of films would be applied to green dielectric sheet 84 in register with plurality of films 72 over which a fourth green dielectric sheet would be disposed. To such a fourth green dielectric sheet a fourth plurality of films would be applied in register with plurality of films 76, and so on. Thereafter, capacitor stack 86 would be subjected to temperature and pressure as heretofore described.

After firing and heat treating capacitor stack 86, the dense monolithic structure resulting would be severed by any suitable means known in the art such as a diamond saw or the like. The assembly would be cut along lines D, E, F, G, and so on in one direction and along lines H, K, J, and so on in the direction perpendicular to lines D, E, F, and G. It is seen that cutting the fired assembly in this manner a plurality of capacitor units are obtained each having an electrode overlapping a portion of a successive electrode while both electrodes have nonoverlapping portions extending in opposite directions. In addition, the ends of the nonoverlapping portions of the electrodes would be automatically exposed during cutting while the sides thereof would not be exposed and would remain hermetically sealed within the mass of glass-ceramic dielectric material. Of course, the cuts along lines H, K, and J must be narrower than the space between the electrodes to achieve hermetic sealing.

It is to be noted that after cutting the assembly along lines D, E, F, and G, capacitor strips are obtained wherein the ends of the individual capacitor electrodes are exposed. Such a strip may be metallized along the cut edges prior to cutting it along lines H, K, and J into individual capacitors. In this manner, a plurality of capacitors can be metallized at one time.

Figure 12:
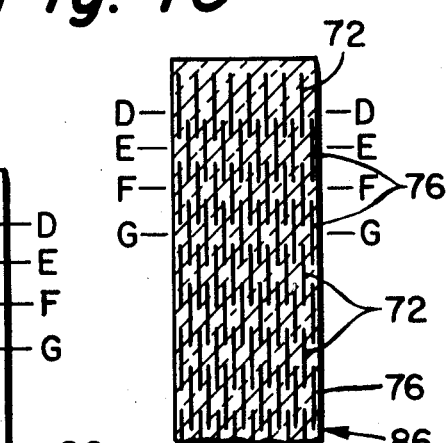
FIG. 12 is a cross-sectional side elevation of the capacitor stack of FIG. 11 taken along lines 12—12 thereof.

FIG. 12 shows capacitor stack 86 after firing and heat treating illustrating how capacitor strips are cut therefrom along lines D, E, F, and G exposing only the ends of the capacitor electrodes.

EXAMPLE I

A typical example carrying out the present invention is illustrated by the following. A suspension of crystallizable glass frit in an organic binder comprising about 80 percent by weight of crystallizable glass frit and about 20 percent by weight of an organic binder was prepared. The glass frit comprised by weight 13.0 percent BaO, 9.0 percent SrO, 18.0 percent PbO, 48 percent $Nb_2O_5$, 7.0 percent $SiO_2$, 2.0 percent $Al_2O_3$, and 0.5 percent $Cu_2O$. The organic binder comprised by weight 2.0 percent of a sodium salt of a carboxylated polyelectrolyte furnished by the Rohm and Haas Company under the trademark Tamol 731, 1.8 percent of a 50 percent solution of ditertiary acetylenic glycol in ethylene glycol furnished by the Air Reduction Company under the trademark Surfynol 104E, 7.0 percent of a water-soluble acrylic emulsion interpolymer described by U.S. Pat. No. 2,795,564 and furnished by the Rohm and Haas Company under the trademark of Rhoplex AC-61, 43.8 percent of a water-solouble acrylic emulsion interpolymer such as that described in U.S. Pat. No. 2,795,564 less the nonionic surfactant disclosed therein and furnished by the Rohm and Haas Company under the trademark Rhoplex B-60-A, and 45.4 percent distilled water. The green dielectric sheet was formed from such suspension by passing a belt through a reservoir thereof whereby the material adhered to the belt forming a thin continuous sheet which was thereafter dried and removed therefrom substantially as taught by the heretofore noted copending U.S. Pat. application Ser. No. 626,560. Individual green dielectric sheets of a 4½ inches×4½ inches size were cut therefrom. A first green dielectric sheet was placed on a rigid table of a silk-screening machine and held in place by means of vacuum in a manner well known in the art. A silk-screening stencil having formed therein an electrode pattern was disposed over the first green sheet and a plurality of films corresponding to the electrode pattern were applied with a slurry of particulate metal in a volatile organic vehicle. The slurry comprised approximately 60 percent finely divided gold power and a volatile organic vehicle, said Reusche No. 163-E, the slurry being passable through a 230 mesh screen. A second green dielectric sheet was then disposed over the electrode pattern substantially in register with the first green dielectric sheet. The slurry of the first plurality of films caused the second green dielectric sheet to adhere to the first one. The silk screen with the electrode pattern was then shifted in one direction such that when a second plurality of capacitor electrodes were printed on the second green dielectric sheet, each such electrode overlapped a portion of at least one of the electrodes applied to the first green dielectric sheet substantially as illustrated in FIG. 11. A third green dielectric sheet was then disposed over the second electrode pattern substantially in register with the first and second green dielectric sheets and a third electrode pattern was then applied to the third green dielectric sheet substantially in register with the first electrode pattern. A fourth green dielectric sheet was disposed over the assembly so formed in register with the other green dielectric sheets and a fourth electrode pattern was applied substantially in register with the second electrode pattern. This process was repeated until a stack having a total of 60 electrode patterns formed on 60 green dielectric sheets was obtained. A last green dielectric sheet was then disposed over the top of the assembly to form a cover therefore.

A layer of mica was then disposed over a rigid steel pallet base and the capacitor stack was placed thereon. Adjacent the stack were disposed four stainless steel standoffs having a height substantially more than the height of the stack. A second rigid steel plate having a layer of mica applied to one surface thereof was placed on the standoffs with the mica facing the stack.

The pallet assembly with the capacitor stack was then placed in a vented furnace which was at a temperature somewhat less than 100° C. and the temperature was raised at a rate of approximately 50° C. per hour to a temperature of about 250° C. which was maintained substantially constant for about 3 hours. The temperature was then increased at a rate of approximately 25° C. per hour to a temperature of about 350° C. and was held at such temperature for about 7 hours. Finally the temperature was raised at a rate of approximately 100° C. per hour to a temperature of 75° C. At this time all the organic materials in the capacitor stack have been burned off or volatilized and the glass frit began to soften.

A force was then applied to the second rigid steel plate of the pallet by means of a hydraulic piston whereby a pressure of about 200 pounds per square inch was applied to the capacitor stack. After about 60 minutes the glass frit particles coalesced and became compacted due to the effect of the temperature and pressure forming a substantially impervious monolithic unit. Thereupon, the pressure was reduced to about 50 pounds per square inch and the temperature was increased to about 970° C. and maintained for approximately 100 minutes to heat treat the assembly after which the pallet was removed from the furnace and the assembly permitted to cool. During this heat treatment cycle, the coalesced glass was crystallized to an extent whereby the dielectric constant of the glass-ceramic was approximately 1250. The monolithic structure was then sawed apart by means of a gang saw which cut the capacitor structure substantially as illustrated in FIGS. 11 and 12 along lines D, E, F, G, and so on. The ends of alternate electrodes were exposed on one cut surface while the ends of the remaining electrodes were exposed at the other cut surface of each capacitor strip. The cut edges of these capacitor strips were then metallized by applying a silver suspension thereto, air drying, and thereafter firing at an elevated temperature to adhere the silver in a manner well known in the art. The capacitor strips were thereafter sawed along lines corresponding to H, K, J, and so on as illustrated in FIG. 11 to provide individual discrete capacitor units. This sawing took place such that the side edges of the capacitor electrodes were not exposed whereupon the capacitor electrodes were hermetically sealed in the monolithic glass ceramic dielectric except for the metallized ends thereof.

The individual capacitor units were thereafter finished by attaching leads to the metallized ends and molding a suitable resinous encapsulant thereabout. The capacitor thus formed resulted in a capacitance of up to about 100,000 picofarads when the total effective overlapping electrode area was about 0.4320 square inches and the dielectric thickness was about 0.0011 inch.

EXAMPLE II

After a capacitor stack as described in Example I was held at about 350° C. for about 7 hours, it was raised at a rate of approximately 100° C. per hour to a temperature of 775° C. at which time all of the organic constituents therein have been burned off or volatilized and the glass frit began to soften. A pressure of 200 pounds per square inch was applied to the capacitor stack. After about 45 minutes the glass frit particles coalesced and became compacted due to the effect of the temperature and pressure forming a substantially impervious monolithic unit. Thereupon, the pressure was reduced to about 50 pounds per square inch and the temperature was increased to about 825° C. and maintained for approximately 100 minutes to heat treat the assembly after which the pallet was removed from the furnace and the assembly permitted to cool. During this heat treatment cycle, the coalesced glass was crystallized to an extent whereby the dielectric constant of the glass-ceramic was approximately 500.

The capacitor thus formed resulted in a capacitance of up to about 40,000 picofarads when the total effective overlapping electrode area was about 0.4320 square inches and the dielectric thickness was about 0.0011 inch.

EXAMPLE III

After a capacitor stack as described in Example I was held at about 350° C. for about 7 hours, it was raised at a rate of approximately 100° C. per hour to a temperature of 775° C. at which time all of the organic constituents therein have been burned off or volatilized and the glass frit began to soften. A pressure of 200 pounds per square inch was applied to the capacitor stack. After about 45 minutes the glass frit particles coalesced and became compacted due to the effect of the temperature and pressure forming a substantially impervious monolithic unit. Thereupon, the pressure was reduced to about 50 pounds per square inch while the temperature remained at 775° C. and this condition was maintained for approximately 2 hours to heattreat the assembly after which the pallet was removed from the furnace and the assembly permitted to cool. During this heat treatment cycle, the coalesced glass was crystallized to an extent whereby the dielectric constant of the glass-ceramic was approximately 300.

The capacitor thus formed resulted in a capacitance of up to about 15,000 picofarads when the total effective overlapping electrode area was about 0.2580 square inches and the dielectric thickness was about 0.0011 inch.

In accordance with the method of the present invention, a monolithic capacitor structure is achieved at relatively low temperatures by completing the compacting and coalescing steps while the dielectric is in a glassy form, and thereafter subjecting the dense, hermetic, compacted and coalesced unit to suitable heat treating whereupon the glass is caused to crystallize resulting in capacitor units with desired electrical properties. All these operations can be performed at temperatures well below the melting point of the metal of the electrodes. For example, in the above examples the electrodes were substantially formed of relatively inexpensive gold having a melting point of about 1063° C., and it is clear that all the steps at elevated temperature took place well below the melting point of gold. This eliminated the need to use, for example, relatively expensive platinum for electrode material to obtain its high melting temperature. The substantially void-free dielectric structure of the resulting capacitors provides mechanical, electrical, and economical advantages which could not be obtained heretofore, such as increased dielectric strength, hermeticity, improved reliability under voltage and temperature loads, higher yields in manufacturing, lower cost, and significantly improved environmental resistance.

Although the present invention has been described with respect to specific details of certain embodiments thereof, it is not intended that such details be limitations upon the scope of the invention except insofar as set forth in the following claims.

1. A method of making a capacitor comprising the steps of
   forming a plurality of thin dielectric sheets in the green state comprising a crystallizable glass frit in an organic binder,
   applying a film of a slurry of particulate metal to at least two of said green dielectric sheets in a predetermined position,
   disposing said green dielectric sheets with said films applied thereto in a stack such that each of said films is separated from adjacent films by one of said green dielectric sheets and such that the first two films of the stack partly overlap each other, alternate films being substantially in register with each other, said films comprising the capacitor electrodes,
   disposing a green dielectric film over the stack so formed as a cover therefor,
   subjecting the stack so formed to an elevated temperature to volatilize any organic constituents therein,
   applying pressure to said stack while at elevated temperature to compact and coalesce said glass and to seal adjacent members together thereby forming a substantially monolithic unit,
   heat treating said unit so as to crystallize the glass to form a glass-ceramic,
   removing the pressure and temperature, and thereafter removing edge portions of said unit as required so as to expose the nonoverlapping ends of said electrodes whereby electrical connection may be made to the capacitor.

2. The method in claim 1 further comprising the step of placing said assembly upon a pallet prior to subjecting it to said elevated temperature.

3. The method of claim 1 further comprising the step of metallizing the ends of said capacitor unit wherein said nonoverlapping ends of said electrodes are exposed.

4. The method of claim 1 further comprising the step of attaching leads to said exposed ends of said electrodes.

5. The method of claim 3 further comprising the step of attaching leads to said capacitor unit at the metallized ends thereof.

6. The method of claim 1 further comprising the step of applying a plurality of films of said slurry to each of said green dielectric sheets, each film on the second dielectric sheet overlapping a portion of at least one film on the first dielectric sheet, corresponding alternate films being substantially in register with each other thereby forming a plurality of capacitor units, and thereafter separating said capacitor units after the glass is crystallized to form discrete capacitors.

7. The method of claim 1 wherein at least about 99 percent by weight of the metallic constituents of said slurry are gold.

8. The method of claim 2 wherein said pressure is applied hydraulically and distributed over said stack by a pressure distribution plate.

9. The method of claim 1 wherein said assembly is subjected to a temperature less than the melting point of said particulate metal.

10. The method of claim 1 wherein said assembly is first subjected to a temperature of less than 100° C., the temperature thereafter being raised to about 250° C. and maintained for about three hours, then increased to about 350° C. and maintained for about seven hours, then increased to a temperature ranging from about 725° C. to about 775° C. and subjected to a pressure of about 200 pounds per square inch for a period ranging from about 45–60 minutes whereupon the temperature is increased to a value ranging from about 775° C. to about 970° C. and the pressure is decreased to about 50 pounds per square inch for an additional period ranging from about 100 minutes to about 2 hours.

11. The method of claim 1 wherein said organic constituents of said stack are volatized and the frit is compacted and coalesced while in a glass state with the unit only thereafter being heat treated to crystallize said glass to form a glass-ceramic.

12. The method of claim 6 wherein said green dielectric sheets with said plurality of films applied thereto are disposed such that when said capacitor units are separated into discrete capacitors, the nonoverlapping ends of said electrodes are simultaneously exposed.

13. The method of claim 1 wherein the nonoverlapping portions of adjacent films extend in directions at least about 90° from one another.

14. The method of making a capacitor comprising the steps of forming a plurality of thin dielectric sheets in the green state comprising a crystallizable glass frit in an organic binder, applying a first film of a slurry of particulate metal to a first of said green dielectric sheets in a predetermined position, disposing a second of said green dielectric sheets over said first film and first dielectric sheet substantially in register with said first dielectric sheet, applying a second film of said slurry to said second dielectric sheet in such manner as to partly overlap said first film, said first and second films comprising the capacitor electrodes, disposing a third of said green dielectric sheets over the stack so formed substantially in register with said first and second dielectric sheets, subjecting the assembly to an elevated temperature to volatilize any organic constituents therein, applying pressure to said assembly while at elevated temperature to compact and coalesce said glass and seal adjacent members together thereby forming a substantially monolithic unit, heat treating said unit so as to crystallize the glass to form a glass-ceramic, removing the pressure and temperature, and thereafter removing edge portions of said unit as required so as to expose the nonoverlapping ends of said electrodes, 15. The method of claim 14 further comprising the step of placing said assembly upon a pallet prior to subjecting it to said elevated temperature.

16. The method of claim 14 further comprising the step of metallizing the ends of said unit wherein said nonoverlapping ends of said electrodes are exposed.

17. The method of claim 14 further comprising the step of attaching leads to said exposed ends of said electrodes.

18. The method of claim 16 further comprising the step of attaching leads to the capacitor unit at the metallized ends thereof.

19. The method of claim 14 further comprising the step of disposing additional green dielectric sheets over said stack in register with said first and second dielectric sheets and applying to each such additional dielectric sheet film of said slurry, each of said films being separated by a green dielectric sheet, alternate films of said stack being in register with each other, the additional films comprising additional capacitor electrodes and being in number corresponding to the desired electrical characteristics of said capacitor.

20. The method of claim 14 wherein each of said films adhere adjacent green dielectric sheets prior to subjecting said stack to said elevated temperature.

21. The method of claim 14 further comprising the step of applying a plurality of films of said slurry to said first and second green dielectric sheets, each film on said second sheet overlapping a portion of at least one film on said first dielectric sheet thereby forming a plurality of capacitor units, and thereafter separating said capacitor units to form discrete capacitors after the glass is crystallized.

22. The method of claim 19 further comprising the steps of applying a plurality of films of said slurry to each of said first, second, and additional green dielectric sheets, each film on said second green dielectric sheets, and all green dielectric sheets alternate therewith being in register with corresponding films on all such sheets and overlapping a portion of at least one film on said first dielectric sheet, said films on said first dielectric sheet and each alternate dielectric sheet therewith being in register with corresponding films on all such sheets thereby forming a plurality of capacitor units each having a plurality of capacitor electrodes, and thereafter separating said capacitor units to form discrete capacitors after the glass is crystallized.

23. The method of claim 14 wherein at least about 99 percent by weight of the metallic constituents of said slurry are gold.

24. The method of claim 15 wherein said pressure is applied hydraulically and distributed over said stack by a pressure distribution plate.

25. The method of claim 14 wherein the temperature to which said assembly is subjected is less than the melting point of said particulate metal.

26. The method of claim 14 wherein said assembly is first subjected to a temperature of less than 100° C., the temperature thereafter being raised to about 250° C. and maintained for about 3 hours, then increased to about 350° C. and maintained for about 7 hours, then increased to a temperature ranging from about 725° C. to about 775° C. and subjected to a pressure of about 200 pounds per square inch for a period ranging from about 45–60 minutes whereupon the temperature is increased to a value ranging from about 775° C. to about 970° C. and the pressure is decreased to about 50 pounds per square inch for a period from about 100 minutes to about 2 hours.

27. The method of claim 1 wherein said organic constituents are volatilized and the frit is compacted and coalesced while in the glass state with the unit only thereafter being heat treated to crystallize said glass to form a glass-ceramic.

28. The method of claim 21 wherein said films are applied to said dielectric sheets so that when said capacitor units are separated into discrete capacitors the nonoverlapping ends of said electrodes are simultaneously exposed.

29. The method of claim 22 wherein said films are applied to said dielectric sheets so that when said capacitor units are separated into discrete capacitors the nonoverlapping ends of said electrodes are simultaneously exposed.

30. The method of claim 14 wherein the nonoverlapping portions of said first and second films extend in directions at least about 90° from one another.

31. The method of making capacitor comprising the steps of forming a plurality of thin dielectric sheets in the green state comprising a crystallizable glass frit in an organic binder,
applying a plurality of films of a slurry of particulate metal to a first of said green dielectric sheets in a predetermined position,
disposing a second of said green dielectric sheets over said first plurality of films and first sheet substantially in register with said first sheet,
applying a plurality of films of said slurry to said second green dielectric sheet, each film on said second sheet overlapping a portion of at least one film on said first dielectric sheet while a portion thereof is nonoverlapping thereby forming a plurality of capacitor units, said first and second plurality of films comprising electrodes of said capacitor units,
applying additional pluralities of films of said slurry of particulate metal to additional of said green dielectric sheets each of said additional green dielectric sheets being disposed over the previous plurality of films in register with the previous green dielectric sheets, each of said films being separated by a green dielectric sheet, alternate pluralities of films being in register with each other, said additional films comprising additional capacitor electrodes, said additional green dielectric sheets with films applied thereto being disposed until a stack of capacitor units having desired electrical properties are obtained,
disposing a green dielectric sheet over the assembly so formed substantially in register with all other green dielectric sheets to provide a cover therefor,
said films temporarily adhering adjacent green dielectric sheets,
the nonoverlapping portions of alternate films extending in directions at least about 90° from the remaining films,
placing the assembly so formed on a pallet,
disposing said pallet in a furnace at a temperature of less than 100° C.,
increasing the furnace temperature to about 250° C. and maintaining it for about 3 hours, then increasing the temperature to about 350° C. and maintaining it for about 7 hours, whereby any organic constituents of said assembly are volatilized,
then increasing the temperature to a value ranging from about 725° C. to about 775° C. and subjecting the assembly to a pressure of about 200 pounds per square inch for a period ranging from about 45–60 minutes whereby the glass frit is coalesced and compacted and adjacent members sealed together thereby forming a substantially monolithic unit,
then increasing the temperature to a value of ranging from about 775° to about 970° C. and decreasing said pressure to about 50 pounds per square inch for a period ranging from about 100 minutes to about 2 hours,
cooling said assembly so as to crystallize the glass to form a glass-ceramic,
said organic constituents being volatilized and the frit compacted and coalesced while in a glass state with the unit only thereafter being heat treated to crystallize the glass to form a glass-ceramic,
the elevated temperature to which said assembly is subjected being less than the melting point of said particulate metal,
separating the structure so formed into individual capacitors in a manner such that the nonoverlapping ends of said electrodes of the individual capacitors are simultaneously exposed while the capacitors are being separated,
said capacitor units being separated after said glass is crystallized,
metallizing the ends of said capacitors wherein said nonoverlapping ends of said electrodes are exposed, and thereafter
attaching leads to said metallized ends of said capacitors.

PO-1050
(5/69)

UNITED STATES PATENT OFFICE
CERTIFICATE OF CORRECTION

Patent No. 3,604,082          Dated September 14, 1971

Inventor(s) Robert D. McBrayer-Forrest I. Peters-Robert D. Smith

It is certified that error appears in the above-identified patent and that said Letters Patent are hereby corrected as shown below:

Column 4, line 60, "preset" should be -- present --; line 66, "AS" should be -- As --.

Column 6, line 14, after "$Al_2O_3$," insert -- 2.5% $B_2O_3$, --; line 43, "power" should be -- powder --.

Column 7, line 10, "75°C" should be --725°C --.

Column 8, line 15, "heattreat" should be two words -- heat treat

Claim 19, line 4, between "sheet" and "film" insert -- a --.

Signed and sealed this 11th day of April 1972.

(SEAL)
Attest:

EDWARD M. FLETCHER, JR.
Attesting Officer

ROBERT GOTTSCHALK
Commissioner of Patents